United States Patent [19]
Olson

[11] 3,840,043
[45] Oct. 8, 1974

[54] IRRIGATION APPARATUS
[75] Inventor: Rich Olson, Scottsbluff, Nebr.
[73] Assignee: Lockwood Corporation, Gering, Nebr.
[22] Filed: June 8, 1972
[21] Appl. No.: 261,010

[52] U.S. Cl. ............................................. 137/344
[51] Int. Cl. ............................................. B05b 15/06
[58] Field of Search .................................. 137/344

[56] References Cited
UNITED STATES PATENTS

| | | | |
|---|---|---|---|
| 3,394,729 | 7/1968 | Bower et al. | 137/344 |
| 3,425,629 | 2/1969 | Bobard | 137/344 X |
| 3,484,046 | 12/1969 | Harris | 137/344 X |
| 3,598,142 | 8/1971 | Neier | 137/344 |
| 3,608,826 | 9/1971 | Reinke | 137/344 |
| 3,628,729 | 12/1971 | Thomas | 137/344 X |
| 3,659,627 | 5/1972 | Zimmerer et al. | 137/344 |
| 3,692,045 | 9/1972 | Carr | 137/344 |

*Primary Examiner*—Henry T. Klinksiek

[57] ABSTRACT

A mobile irrigation apparatus which includes a pivot tower, a distribution pipe extending radially from the pivot tower and a control system in which the electrical conductors are led through the pivot tower on to the distribution pipe, and a master control panel mounted on the distribution pipe. The mounting of the master control panel on the distribution pipe minimizes the number of electrical conductors which must be passed through the pivot tower to provide a system which is more economical and reliable.

5 Claims, 4 Drawing Figures

IRRIGATION APPARATUS

This invention relates to a self-propelled sprinkling system for large areas having a central source of water supply and it relates more particularly to a control system for such sprinkling systems.

Self-propelled sprinkling systems for irrigation of large areas are now well known. In a typical system, use is made of a main distributor pipe which may be as much as one-half mile in length, with the inner end portion of the pipe connected to a source of water for supply of water under pressure to sprinkling heads spaced along the length of the pipe for dispensing the water onto the crops in the field covered by the sprinkling system. The transmission pipe can be adapted to move across the field in a substantially straight line but it is usually mounted for rotation about a central pivot where one end of the distributor pipe is connected to the water supply. The distributor pipe is supported on a plurality of driven towers located at spaced intervals along the length of the distributor pipe and which operate to carry the pipe across the field. Typical systems are illustrated in U.S. Pats. to Zyback, No. 2,604,359; Behlen, U.S. Pat. No. 2,726,895; Bower et al. U.S. Pat. No. 3,394,729; Curtis, U.S. Pat. Nos. 3,352,403 and 3,352,439, and Dowd, U.S. Pat. No. 3,342,417.

In a rotary system as described, the central pivot includes a tower which is mounted on the ground and includes a water feed pipe leading from a water source such as a well, stream or the like, to a swivel connection near the top of the tower. The swivel connection is attached to the elongate horizontally disposed water distribution pipe which is driven about the swivel connection as an axis by a series of mobile towers to distribute water to the crops in the field.

As is described in copending application Ser. No. 237,692 filed Mar. 24, 1972 and entitled "Mobile Irrigation Apparatus and Alignment Control," alignment of each of the mobile towers which support the elongate water distribution pipe can be insured by a three-phase electric motor mounted on each tower which can be driven in forward and reverse direction and placed in neutral in response to a flexible cable which activates various switches on the tower, depending on the relative position of the mobile tower relative to the other towers.

Various other controls are used in the operation of such sprinkler systems, and include switches to start, stop and reverse the direction of travel of the mobile towers, a timer mechanism to control the length of time the system is in operation, a power transformed to reduce the 460 volts supplied to the system to 110 volts to operate the alignment system as well as numerous other electrical systems employed in the operation of the sprinklers.

It is necessary that the control phase system be operatively connected to each of the mobile towers supporting the water distribution pipe to provide power to the three-phase motors on each of the towers and to actuate the alignment system on each of the towers.

In the past, it has been the practice to mount the master control panel on the stationary pivot tower and pass a minimum of seven wires or electrical leads up to the tower for connection with wires extending alongside or through the water distribution pipe whereby the wires become wrapped around the tower as the distribution pipe is driven about the maypole. For systems having more sophisticated control systems, up to 11 wires have to be mounted through the tower. It has been found that the continuous winding of such wires about the tower has given rise to numerous problems in the practical use of such sprinkling systems with the result that the wiring deteriorates over prolonged use.

It has also been proposed to connect the control panel to the electrical leads on the distribution pipe through a collector ring mounted on top of the tower to avoid winding the wires about the maypole. As is well known to those skilled in the art, such collector rings are formed of a rotatable metal disc for each electrical lead and a brush contactor in continuous contact with the disc whereby the brush continuously transmits an electrical signal to the rotatable disc. However, it has been found that such collector rings containing seven to eleven or more discs are complex and expensive to manufacture and use.

It is accordingly an object of the present invention to provide a mobile sprinkling system which overcomes the foregoing disadvantages, and it is a more specific object of the invention to provide a mobile sprinkling system which makes use of a simpler and more reliable electrical control system.

It is a related object of the present invention to provide a mobile sprinkling system in which the number of electrical leads through the pivot is minimized to provide an irrigation system which is more reliable and less expensive to manufacture and use.

These and other objects and advantages will appear more fully hereinafter and, for purposes of illustration but not of limitation, embodiments of the invention are shown in the accompanying drawings in which.

Figure 1:
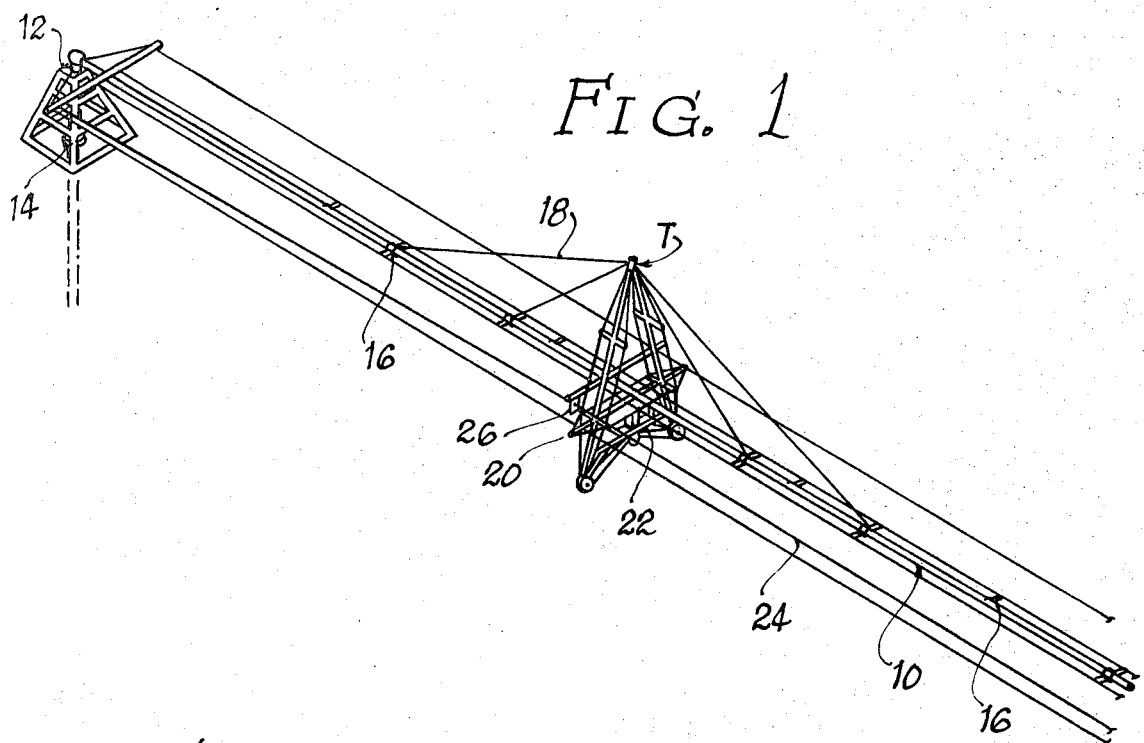
FIG. 1 is a perspective view of a self-propelled sprinkling system embodying the features of this invention, showing the pivot tower and the adjacent section of distributor pipe supported by a mobile tower.

The concepts of the present invention reside in a mobile sprinkling system including a pivot tower and an elongate water distribution pipe supported by a plurality of motor driven, mobile towers wherein the master control system is mounted on the distribution pipe. It has been found that by mounting the master control panel in an outboard fashion on the rotatable portion of the system, the number of electrical leads which are passed through the tower are at a minimum to thereby provide a greatly simplified design and greater reliability in the overall system.

Referring now to the drawings for a detailed description of the invention, the numeral 10 indicates the elongate horizontally disposed water distribution pipe which is provided with a swivel connection 12 at its inner end for pivotal attachment to the upper end of a feed pipe 14 which may extend downwardly to a well in the ground or which is otherwise supplied with water under pressure for irrigation, as from a stream, well or other source of water. Thus, the feed pipe 14 represents the axis about which the water distributor pipe turns.

The distributor pipe is provided with a plurality of spray nozzles 16 at frequently spaced intervals along the length of the pipe for operation as overhead sprays to sprinkle water onto the crop as the distributor pipe moves about the feed pipe as its axis. The distributor pipe is supplied with water under pressure, as by means of a water pump connected with a supply pipe or water tower.

A number of mobile towers T are arranged in longitudinally spaced apart relation along the length of the distributor pipe with means for engaging the adjacent portions of the pipe for support. The number of mobile towers T can be varied depending somewhat upon the spaced relationship between supports and the length of the distributor pipe. The distributor pipe 10 can be suspended from the support by means of a cable so as to be carried by the support. It can rest on the tower as on a cradle rigidly secured to the support but, in accordance with the preferred practice of this invention, the distributor pipe 10 is rigidly connected with the support tower as by means of suitable straps 18 and struts 20.

For a complete description of such mobile towers, reference can be made to the foregoing copending application. Suffice it to say that each tower is driven, preferably by a three-phase electric motor 22 in response to an alignment control system including a flexible cable 24 and a switch 26 as described in the aforementioned copending application.

Figure 2:
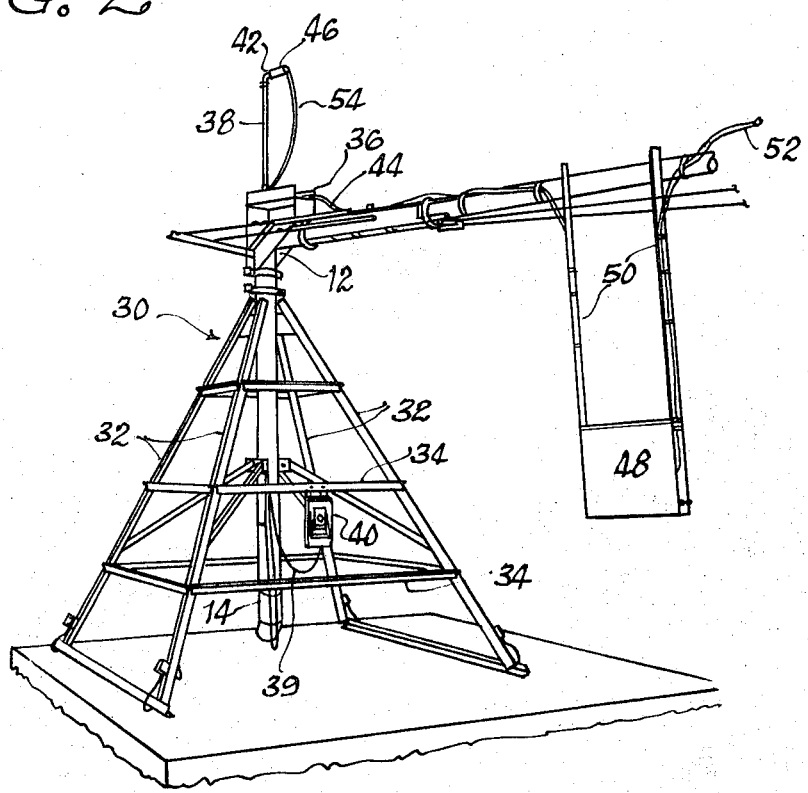
FIG. 2 is a perspective view of one pivot tower which embodies the concepts of the invention.

One embodiment of the invention is shown in FIG. 2 in which the pivot tower is illustrated in greater detail. As can be seen from this Figure, the pivot tower 30 is formed of a rigid support including legs 32 having a pyramidal configuration which are secured together by cross members 34. As will be appreciated by those skilled in the art, the structural details of the tower 30 itself do not form part of the invention as any of a variety of rigid supports can be used in the practice of the invention.

The tower 30 serves to support the water supply or feed pipe 14 which is provided at its upper end with the swivel connection 12 which is connected to the water distribution pipe 10. Mounted above the swivel connection 12 is a bracket 36 rotatable with the swivel connection as the latter is rotated about the feed pipe 14 through which there extends a fixed maypole 38 in the form of an elongate tube containing the electrical conductors and mounted on the tower 30 or preferably the feed pipe 14 so as to be fixed.

The electrical conductors 39 pass from a junction box 40 or the like adapted to be connected to a suitable power source (not shown) and run up the side of or through the feed pipe 14 into the maypole 38 which terminates in a connector plug 42 which may be a conventional female plug. The electrical conductors 44 which extend along the distribution pipe 10 terminate on one end in a plug 46 adapted to engage the plug 42 to complete a circuit between the junction box 40 and the conductors.

The other end of conductors 44 lead to the master control panel 48 which is mounted outboard of the pivot tower 30 on the distribution pipe 10. As illustrated in FIG. 2, the control panel 48 can be simply suspended from the pipe 10 by means of a pair of brackets 50. The details as to the master control panel form no part of the present invention since control elements for use with the system of the present invention are themselves well-known. As indicated above, the control panel 48 can contain on-off switching means, forward and reverse switching means, transformer means to reduce the voltage supplied to a lower valve sufficient to operate the alignment control system, timer means, means to shut down operation of the system in response to freezing temperatures and for low pump pressure, time delay means for restarting pump operation in the event of a power failure as well as numerous other control means. In any case, the number of electric connectors or wires 52 leading out of master control panel 48 to control the overall movement of the mobile towers is greater than the number of electrical wires or conductors 44 leading into the panel 48.

For example, according to a preferred embodiment, the conductors which are passed through the maypole include 3 power conductors for a three-phase 460 volt power supply, a ground conductor and a conductor for control of a pump supplying water to the feed pipe, whereas 8 or more conductors pass out of the control panel to control the operation of the mobile towers. As will be appreciated by those skilled in the art, if the master control panel 48 were mounted on the stationary pivot tower, a greater number of wires would have to be passed through the maypole to render the system more expensive and complex to manufacture and to render the system less reliable.

In the operation of the embodiment illustrated in FIG. 2, the system is activated, and the distribution pipe 10 is driven about the tower 30 whereby the swivel connection 16 is caused to rotate relative to feed pipe 14. As the swivel connection is caused to rotate relative to pipe 14, the bracket or shield 36 is likewise caused to rotate with the swivel connection. A portion or length 54 of the electrical connectors 44 having the plug 46 on one end thereof is fixed onto the shield 36 whereby the portion 54 is wound around the maypole as the distribution pipe 10, the swivel connection 16 and the shield 36 are rotated about the feed pipe 14 and the maypole 38. As shown in FIG. 2, the shield 36 defines a trough through which the electrical conductors 44 extend to join portion 54 to prevent the conductors from becoming entangled with the swivel connection 16.

As will be appreciated by those skilled in the art, the distribution pipe can be caused to rotate about the tower 30 and the maypole 38 until the portion 54 of the electrical conductors 44 is tightly wound about the maypole. Thereafter, the direction of travel of the distribution pipe 10 can be reversed whereby the portion 54 is unwound from the maypole 38 and then wound tightly around the maypole in the opposite direction. However, it is preferred that rotation of the distribution pipe 10 be such that the portion 54 is not wound too tightly around the maypole to avoid unnecessary wear or damage to the portion 54 of electrical conductors 44.

Figure 3:
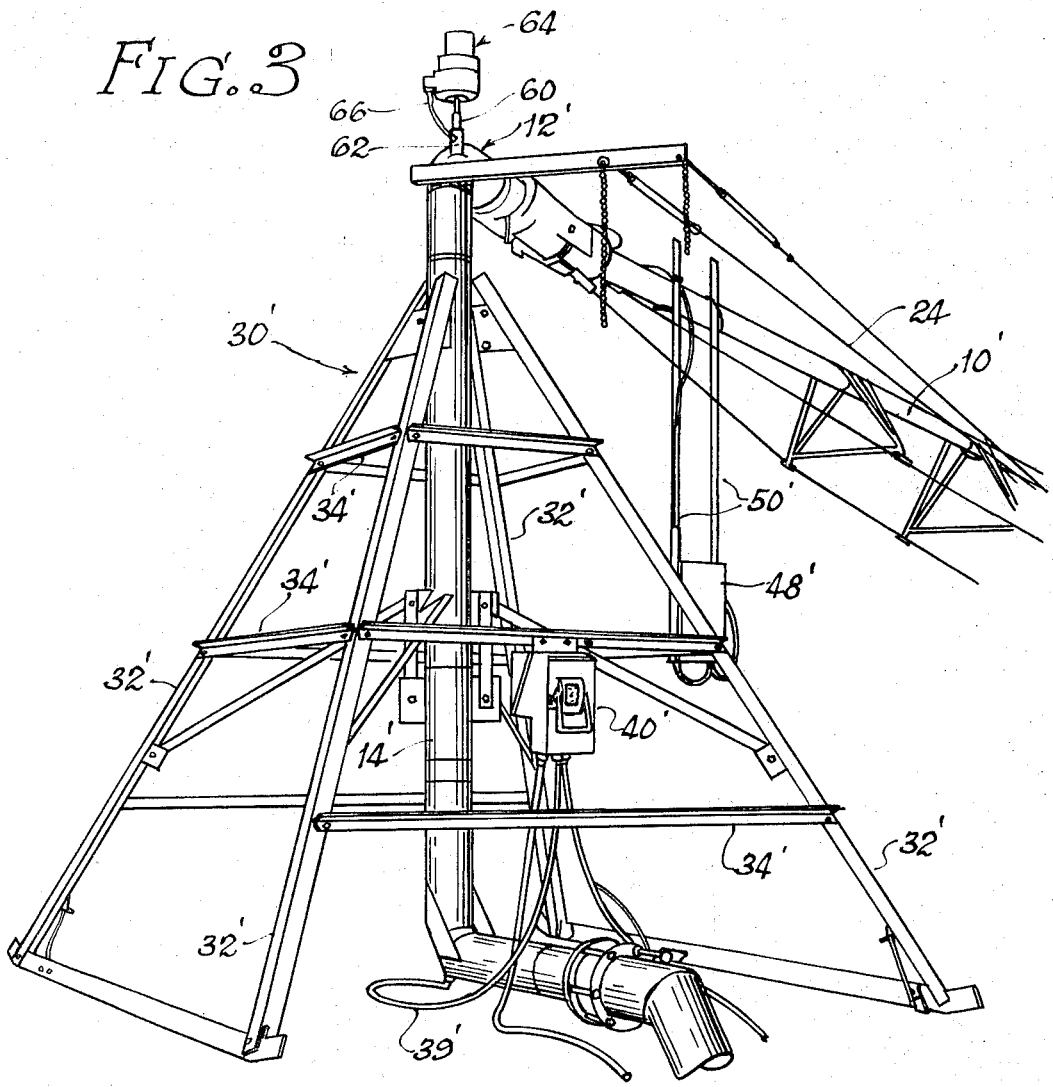
FIG. 3 is a perspective view of another pivot tower for use with the sprinkling system of the invention.

Another, and frequently preferred, embodiment of the present invention is illustrated in FIG. 3 of the drawing in which the same elements are designated by the same reference numerals followed by a prime ('). In this embodiment, the pivot tower 30' includes electrical connectors 39' leading from a junction box 40' or the like through the feed pipe 14' and through a conduit 60 extending from the swivel connector 12'. A seal between the swivel connector 12' and conduit 60 is provided by way of a nipple 62. In this way, the conduit 60 is fixed relative to swivel connector 12' whereby the conduit 60 remains stationary as the swivel connector 12' is caused to rotate relative to feed pipe 14'.

The electrical conductors 39' extend through conduit 60 to a collector ring generally designated as 64 to provide an input thereto. The output of the collector ring 64 is a plurality of electrical connectors designated as 66 which lead from the collector ring 64 along the pipe 10' to the master control panel 48' mounted in an outboard manner on the distribution pipe 10'.

Figure 4:
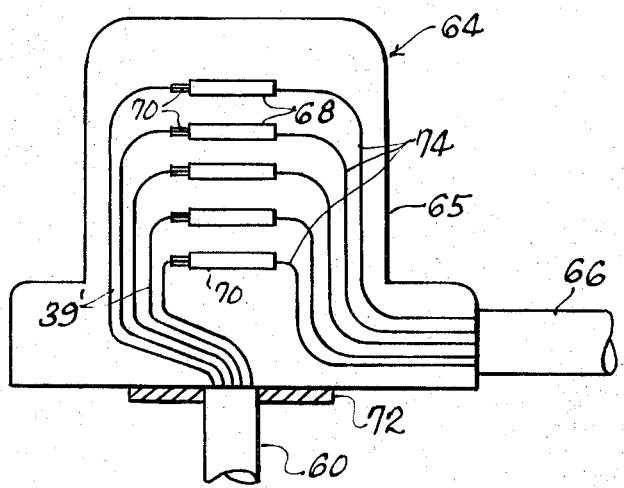
FIG. 4 is a schematic view of a collector ring assembly used in combination with an embodiment of the invention.

The collector ring 64 can be a conventional collector ring of the type well known to those skilled in the art and one such collector ring is illustrated in FIG. 4 of the drawing. Such collector rings generally include a plurality of discs, one for each electrical conductor, and a plurality of brushes associated with each of the discs. Either the brushes or the discs are mounted for rotation with the swivel connector 12' whereby one of the brushes or discs is rotated relative to the other to continuously maintain electric contact during rotation of the swivel connector 12'.

In the representative embodiment illustrated in FIG. 4, the collector ring 64 is shown as having a casing 65 which is mounted for rotation on a bushing 72 fixed to conduit 60. The casing includes a plurality of discs 68 therein which are fixed to the casing and therefore are rotatable with the casing about bushing 72 and conduit 60 as the swivel connector 16' is rotated relative to the feed pipe 14'. Each of the electrical conductors generally designated as 39' extend into the casing 65 and terminate in brushes 70 which are constantly in contact with the discs 68 to insure electrical connection therebetween.

Each of the discs is connected to the output line 66 by a plurality of wires generally designated as 74 in FIG. 4. Thus, as the swivel connector 12' is rotated with the distribution pipe 10', the casing 65 and the disc 68 secured thereto are caused to rotate with the swivel connector 12'. Electrical contact between the electrical conductors 39' and the conductor 66 is assured by way of the brushes 70 in continuous contact with the discs 68 as the latter are continuously caused to rotate. In this way, the winding of electrical conductors about any portion of the tower 30' is completely eliminated.

Since the master control panel is mounted in an outboard manner in accordance with the practice of the invention, a minimum number of electrical conductors need be passed through the collector ring, with the result that the number of disc and brush assemblies in the collector ring is the minimum to thereby assure maximum reliability.

It will be understood that various changes and modifications can be made in the details of construction, operation and use without departing from the spirit of the invention, especially as defined in the following claims.

I claim:

1. In a mobile irrigation apparatus including a pivot tower, a feed pipe mounted on the tower, an elongate distribution pipe extending radially outwardly from the feed pipe, swivel connection means mounted on the feed pipe to supply liquid from the feed pipe to the distribution pipe, with the swivel connection means being rotatable on the feed pipe, mobile motor-driven tower means supporting the distribution pipe and adapted to drive the distribution pipe pivotally about the pivot tower and control means to control the operation of the apparatus, said control means including a master control panel and a plurality of electrical conductors leading into the control panel and a plurality of electrical conductors leading out of the control panel to the mobile tower means, with the number of conductors leading out of the control panel being greater than the number of conductors leading into the control panel, the improvement wherein the control panel is mounted on the distribution pipe and the electrical conductors leading to the control panel are passed through the tower to the master control panel.

2. Apparatus as defined in claim 1 which includes a maypole fixed to the tower relative to the swivel connection, and the electrical conductors leading to the control panel pass through the maypole on to the distribution pipe to the control panel whereby the conductors are wound around the maypole as the distribution pipe is driven about the pivot tower.

3. Apparatus as defined in claim 2 which includes a length of electrical conductor, one end of which is attached to the electrical conductors in the maypole, the other end of which is fixed for rotation with the swivel connection.

4. Apparatus as defined in claim 3 wherein the length of electrical conductors is releasably attached to the electrical conductors in the maypole by plug means.

5. Apparatus as defined in claim 1 which includes a collector ring housing, a plurality of discs and a plurality of brushes associated with each disc, with one of the discs and brushes being rotatable relative to the other with the swivel connection, and the electrical conductors leading to the control panel are passed up the tower to one of the brushes and the discs, and the electrical conductors leading to the control panel from the collector ring to the master control panel are in contact with the other of the brushes and discs to complete a circuit through the collector ring as the swivel connection is rotated about the feed pipe.

* * * * *